(12) United States Patent
Chiang et al.

(10) Patent No.: US 11,172,203 B2
(45) Date of Patent: Nov. 9, 2021

(54) INTRA MERGE PREDICTION

(71) Applicant: MediaTek Inc., Hsinchu (TW)

(72) Inventors: Man-Shu Chiang, Hsinchu (TW); Chih-Wei Hsu, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/047,506

(22) Filed: Jul. 27, 2018

(65) Prior Publication Data
US 2019/0052886 A1    Feb. 14, 2019

Related U.S. Application Data

(60) Provisional application No. 62/542,383, filed on Aug. 8, 2017.

(51) Int. Cl.

| | | |
|---|---|---|
| *H04N 19/107* | (2014.01) | |
| *H04N 19/109* | (2014.01) | |
| *H04N 19/139* | (2014.01) | |
| *H04N 19/196* | (2014.01) | |
| *H04N 19/105* | (2014.01) | |
| *H04N 19/159* | (2014.01) | |
| *H04N 19/176* | (2014.01) | |

(52) U.S. Cl.
CPC ......... *H04N 19/139* (2014.11); *H04N 19/105* (2014.11); *H04N 19/107* (2014.11); *H04N 19/109* (2014.11); *H04N 19/159* (2014.11); *H04N 19/176* (2014.11); *H04N 19/196* (2014.11); *H04N 19/198* (2014.11)

(58) Field of Classification Search
CPC .... H04N 19/52; H04N 19/109; H04N 19/139; H04N 19/159; H04N 19/51; H04N 19/107
See application file for complete search history.

(56) References Cited

U.S. PATENT DOCUMENTS

| | | | |
|---|---|---|---|
| 8,917,772 B2 * | 12/2014 | Oh ........................ | H04N 19/176 |
| | | | 375/240.16 |
| 9,374,578 B1 | 6/2016 | Mukherjee et al. | |
| 9,565,446 B2 * | 2/2017 | Oh ........................ | H04N 19/105 |

(Continued)

FOREIGN PATENT DOCUMENTS

| | | |
|---|---|---|
| CN | 103096071 A | 5/2013 |
| CN | 105580372 A | 5/2016 |
| WO | WO 2016072775 A1 | 5/2016 |

OTHER PUBLICATIONS

NPL Google Search; 2019. (Year: 2019).*
Redundancy reduction in Cbf and merging coding; Li; et al; 2010. (Year: 2010).*
Unified Merge and AMVP candidates' selection; Zheng; 2011. (Year: 2011).*

(Continued)

*Primary Examiner* — Luis Perez-Fuentes
(74) *Attorney, Agent, or Firm* — Han IP PLLC; Andy M. Han

(57) ABSTRACT

A combined prediction mode for encoding or decoding a pixel block of a video picture is provided. When it is determined that the combined prediction mode is used, a video codec generates an intra predictor for the current block based on a selected intra-prediction mode and a merge-indexed predictor for the current block based on a selected merge candidate from a merge candidates list. The video codec then generates a final predictor for the current block based on the intra predictor and the merge-indexed predictor. The final predictor is then used to encode or decode the current block.

19 Claims, 14 Drawing Sheets

(56) References Cited

U.S. PATENT DOCUMENTS

| | | | |
|---|---|---|---|
| 9,918,101 B2* | 3/2018 | Park | H04N 19/56 |
| 9,948,951 B2* | 4/2018 | Ikai | H04N 19/597 |
| 10,110,922 B2* | 10/2018 | Zhang | H04N 13/10 |
| 10,306,256 B2* | 5/2019 | Laroche | H04N 19/107 |
| 10,666,936 B2* | 5/2020 | Lee | H04N 19/198 |
| 10,742,974 B2* | 8/2020 | Park | H04N 19/11 |
| 2013/0114720 A1* | 5/2013 | Wang | H04N 19/197 375/240.16 |
| 2013/0136183 A1* | 5/2013 | Kim | H04N 19/52 375/240.16 |
| 2013/0195188 A1* | 8/2013 | Sugio | H04N 19/176 375/240.14 |
| 2013/0336406 A1* | 12/2013 | Zhang | H04N 19/597 375/240.16 |
| 2014/0321547 A1* | 10/2014 | Takehara | H04N 19/105 375/240.16 |
| 2015/0085930 A1* | 3/2015 | Zhang | H04N 19/136 375/240.15 |
| 2016/0261868 A1* | 9/2016 | Chien | H04N 19/70 |
| 2018/0376149 A1* | 12/2018 | Zhang | H04N 19/182 |

OTHER PUBLICATIONS

Block Merging for Quadtree-Based Partitioning in HEVC; Helle; 2012. (Year: 2012).*
Taiwan Intellectual Property Office, Office Action for Taiwan Patent Application No. 107126701, dated Oct. 8, 2019.
China National Intellectual Property Administration, Office Action for China Patent Application No. 201880051361.5, dated Mar. 22, 2021.
European Patent Office, Supplementary European Search Report for European Patent No. 18844,977.1, dated Mar. 11, 2021.
Man-Shu Chiang et al., CE10.1.1: Multi-hypothesis prediction for improving AMVP mode, skip or merge mode, and intra mode, Joint Video Experts Team (JVET) of ITU-T SG 16 WP 3 and ISO/IEC JTC 1/SC 29/WG 11, Document: JVET-L0100-v3, 12th Meeting, Macao China, Oct. 3-12, 2018.
Chih-Wei Hsu, et al., Description of Core Experiment 10: Combined and multi-hypothesis prediction, Joint Video Experts Team (JVET) of ITU-T SG 16 WP 3 and ISO/IEC JTC 1/SC 29/WG 11, Document: JVET-J1030_r1, 10th Meeting, San Diego, US, Apr. 10-20, 2018.
Xin Jin et al., Combined Inter-Intra Prediction For High Definition Video Coding, Picture Coding Symposium, Nov. 7-9, 2007.

* cited by examiner

| Merge_index | L0 | L1 |
|---|---|---|
| 0 | mvL0_A, ref0 | - |
| 1 | - | mvL1_B, ref0 |
| 2 | | |
| 3 | | |
| 4 | | |

→

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

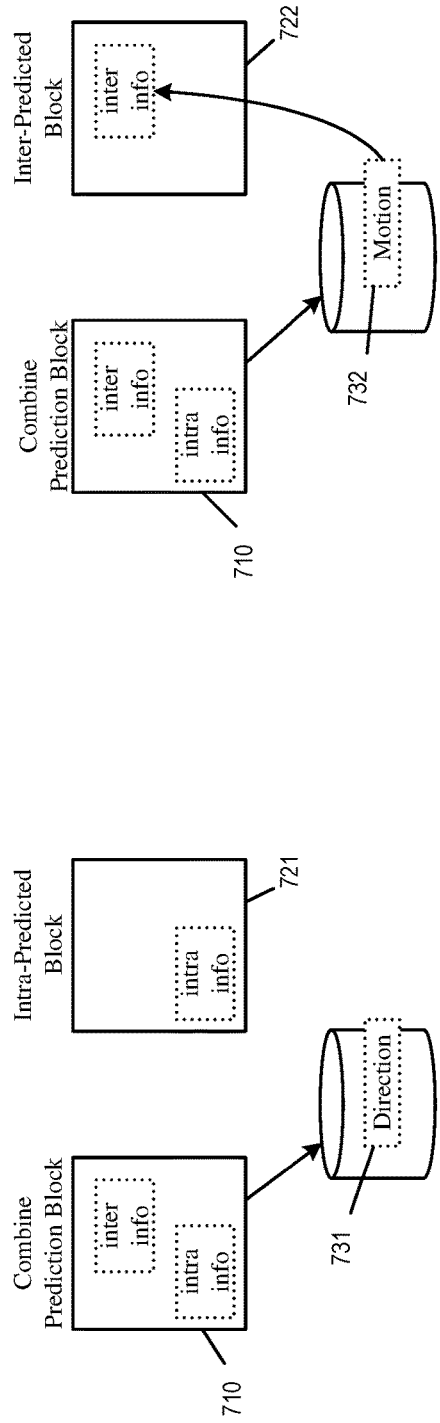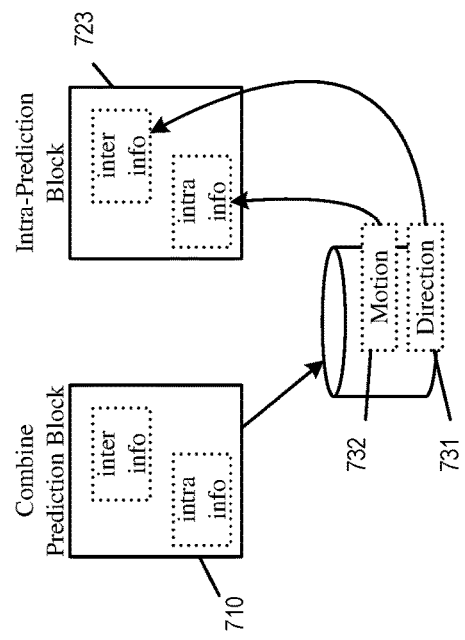
Figure 7a
Figure 7b
Figure 7c

INTRA MERGE PREDICTION

CROSS REFERENCE TO RELATED PATENT APPLICATION(S)

The present disclosure is part of a non-provisional application that claims the priority benefit of U.S. Provisional Patent Application No. 62/542,383, filed on 8 Aug. 2017. Contents of the above-listed application are herein incorporated by reference.

TECHNICAL FIELD

The present disclosure relates generally to video processing. In particular, the present disclosure relates to methods for encoding or decoding a block of pixels by prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs). Each PU corresponds to a block of pixels in the CU.

To achieve the best coding efficiency of hybrid coding architecture, HEVC employs intra-prediction and/or inter-prediction modes for each PU. For intra-prediction modes, the spatial neighboring reconstructed pixels can be used to generate the directional predictions in 35 directions. For inter-prediction modes, motion information is used to reconstruct temporal reference frames, which are used to generate motion compensated predictions. Motion information may include motion vectors, motion vector predictors, motion vector differences, reference indices for selecting reference frames, etc.

There are three types of inter-prediction modes: skip mode, merge mode, and advanced motion vector prediction (AMVP) mode. Under AMVP mode, motion vectors (MVs) used for motion-compensated prediction of PUs are derived from motion vector predictors (MVPs) and motion vector differences (MVDs, or residual motion data) according to MV=MVP+MVD. For an AMVP-predicted PU, the MVP is selected from among a set of MVP candidates that includes two spatial candidates and one temporal candidate. An index that identifies the MVP selection is encoded and transmitted along with the corresponding MVD as motion information. Reference index for selecting a reference frame (or reference indices for selecting reference frames) from reference frame list L0 and/or L1 for bidirectional or unidirectional prediction is also encoded and transmitted as motion information.

When a PU is coded in either skip mode or merge mode, no motion information is transmitted except the merge index of the selected candidate. That is because skip mode and merge mode utilize motion inference methods (MV=MVP+MVD where MVD is zero) to obtain the motion information from spatially neighboring blocks (spatial candidates) or collocated blocks in temporally neighboring pictures (temporal candidates) that are selected from reference frame list L0 or L1 (indicated in slice header). In the case of a skip PU, the residual signal for the block being coded is also omitted. To relay motion information for a pixel block under HEVC by using AMVP, merge mode, or skip mode, an index is used to select an MVP (or motion predictor) from a list of candidate motion predictors. In merge/skip mode, a merge index is used to select an MVP from a list of candidate motion predictors that includes four spatial candidates and one temporal candidate. The merge index is transmitted, but motion predictors are not transmitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide an Intra Merge Prediction (IMP) mode, which is a prediction mode that combines intra-prediction mode with merge mode when encoding or decoding a block of pixels. When employing IMP mode, a video codec selects an intra-prediction mode and a merge mode. The video codec obtains a combined prediction through a simple average or weighted sum of the prediction generated by the selected intra-prediction mode and the prediction generated by the selected merge mode. In some embodiments, in addition to an index for selecting the intra-prediction mode, the video codec uses an IMP mode flag in a video coding bitstream to indicate whether merge mode prediction should also be applied. If the IMP mode flag indicates that merge mode is being used for a particular block of pixels in addition to intra-prediction mode, an IMP merge index is provided to signal the selection of a merge candidate from a merge candidates list for the block of pixels.

The IMP mode can be generally referred to as a combined prediction mode. When encoding or decoding a video picture, the video codec determines whether to use the combined prediction mode to encode or decode a current block of pixels of the video picture. When it is determined that the combined prediction mode is used, the video codec generates an intra predictor for the current block based on a selected intra-prediction mode and a merge-indexed predictor for the current block based on a selected merge candidate from a merge candidates list. The video codec then generates a final predictor for the current block based on the intra predictor and the merge-indexed predictor. The final predictor is then used to encode or decode the current block.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 7a-c illustrates referencing motion information and/or mode direction from neighboring blocks of a combination prediction coded block.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Intra-Prediction Mode

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

Figure 1:
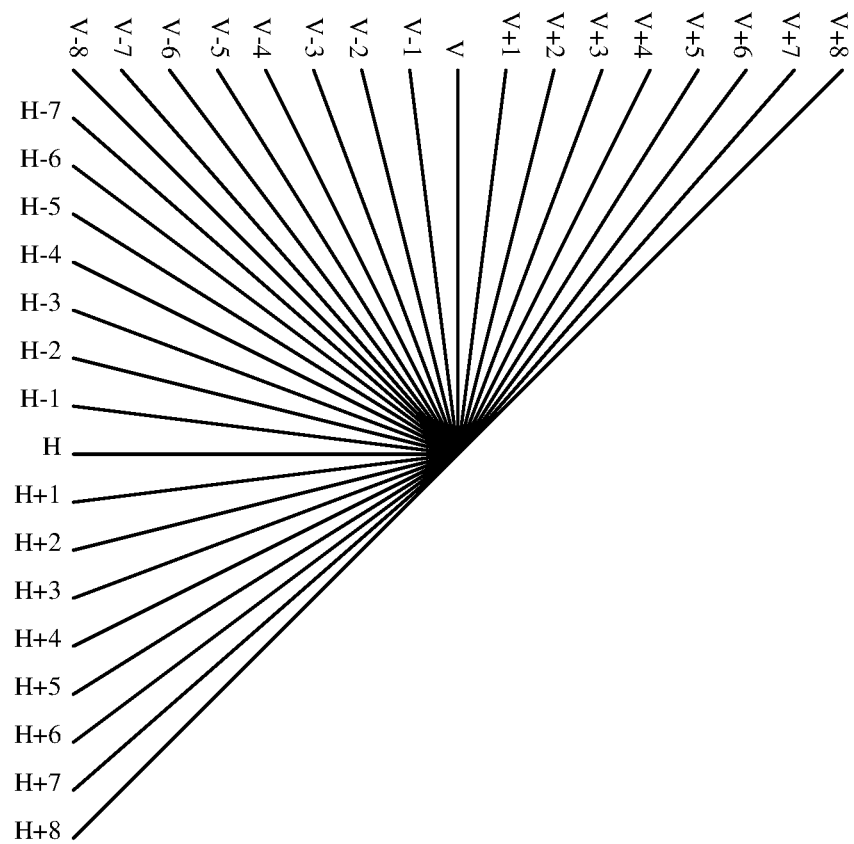
FIG. 1 shows the intra-prediction modes in different directions.

FIG. 1 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H−1~H−7, V, V+1~V+8, V−1~V−8 are used. Generally directional modes can be represented as either as H+k or V+k modes, where k=±1, ±2, . . . (so if intra-prediction mode has 65 directional modes, k can be range from ±1 to ±16).

Out of the 35 intra-prediction modes in HEVC, 3 modes are considered as most probable modes (MPM) for predicting the intra-prediction mode in current prediction block. These three modes are selected as an MPM set. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

Inter-Prediction Modes

Figure 2:
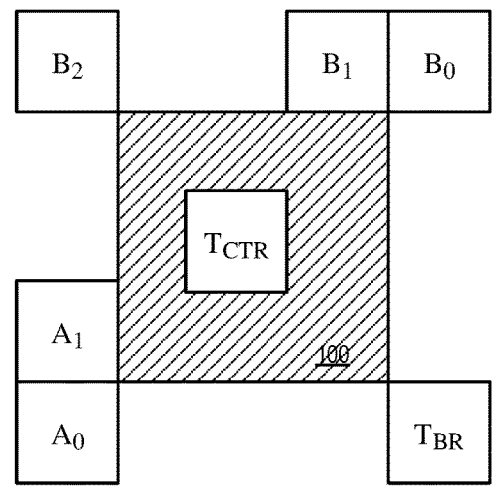
FIG. 2 shows the MVP candidates set for inter-prediction modes in HEVC.

FIG. 2 shows the MVP candidates set for inter-prediction modes in HEVC (i.e., skip, merge, and AMVP). The figure shows a current block 100 of a video picture or frame being encoded or decoded. The current block 100 (which can be a PU or a CU) refers to neighboring blocks to derive the spatial and temporal MVPs for AMVP mode, merge mode or skip mode.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)

2. Scaled bi-predictive merge candidate (derived candidate type 2)

3. Zero vector merge/AMVP candidate (derived candidate type 3)

Figure 3:
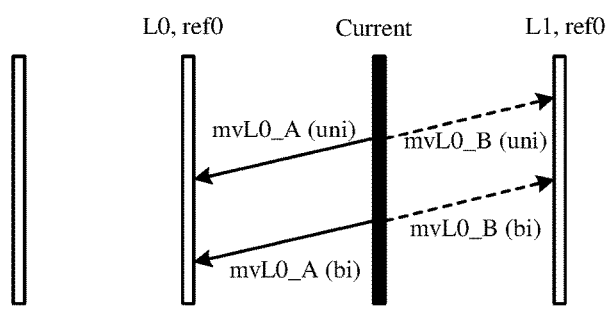
FIG. 3 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 3 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 4, 5:
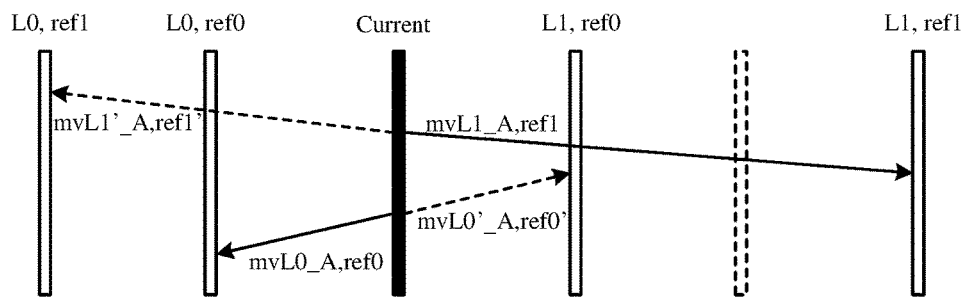
FIG. 4 illustrates a merge candidates list that includes scaled merge candidates.
FIG. 5 illustrates an example in which zero vector candidates are added to a merge candidates list or an AMVP candidates list.

For derived candidate type 2, scaled merge candidates are created by scaling original merge candidates. FIG. 4 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 5 illustrates an example in which zero vector candidates are added to a merge candidates list or an AMVP candidates list.

Intra Merge Prediction

Some embodiments of the disclosure provide an Intra Merge Prediction (IMP) mode, which is a prediction mode that combines intra-prediction mode with merge mode when encoding or decoding a block of pixels. When employing IMP mode, a video codec (encoder or decoder) selects an intra-prediction mode (from the possible intra-prediction modes) and a merge candidate (from a merge candidates list). The video codec obtains a combined prediction (also referred to as final predictor) through a simple average or weighted sum of the prediction generated by the selected intra-prediction mode and the prediction generated by the selected merge candidate. In some embodiments, in addition to an index for selecting the intra-prediction mode, the video codec uses an IMP mode flag in a video coding bitstream to indicate whether merge mode prediction should also be applied. If the IMP mode flag indicates that merge mode is being used for a particular block in addition to intra-prediction mode, an IMP merge index is provided to signal the selection of a merge candidate from a merge candidates list for the PU.

The IMP mode can be generally referred to as a combined prediction mode. When encoding or decoding a video picture, the video codec determines whether to use the combined prediction mode to encode or decode a current block of pixels (e.g., a PU or a CU) of the video picture. When it is determined that the combined prediction mode is used, the video codec generates an intra predictor for the current block based on a selected intra-prediction mode and a merge-indexed predictor for the current block based on a selected merge candidate from a merge candidates list. The video codec then generates a final predictor for the current block based on the intra predictor and the merge-indexed predictor. The final predictor is then used to encode or decode the current block.

The combined prediction mode is especially suitable for an area with complex texture (e.g., area containing edges/rings, etc.), which cannot be well-predicted with pure intra or inter prediction mode. Thus, applying the combined prediction mode to the area with complex texture would achieve a better coding gain.

Moreover, when combining predictions, using merge-indexed predictor instead of inter predictor can further reduce the signaling overhead. Using the merge-indexed predictor requires only the signaling of the merge index (the corresponding motion information can be implicitly derived). This is in contrast to using the inter predictor, which requires the signaling of the reference index, MVP index, and the MVD in addition to the merge index.

Figure 6:
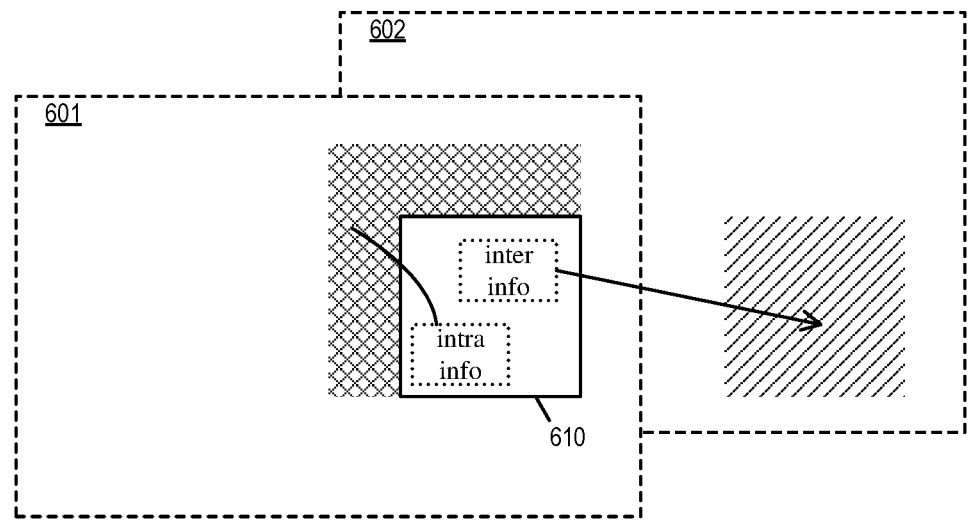
FIG. 6 conceptually illustrates encoding or decoding a block of pixels by using the combined prediction mode.
Figure 6:
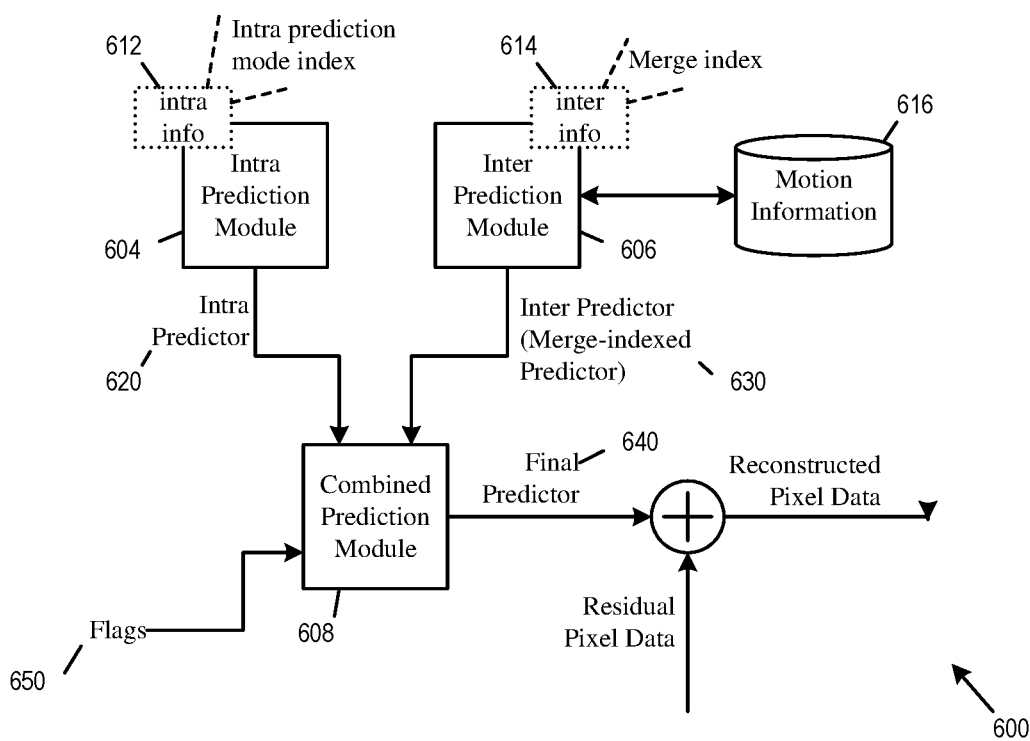

FIG. 6 conceptually illustrates encoding or decoding a block of pixels by using the combined prediction mode. The figure illustrates a video sequence that includes video pictures 601 and 602 that are scheduled to be displayed at different times. The video picture 601 includes a block of pixels 610 that is encoded or to-be-encoded in combined prediction mode. The block of pixels 610 may be a PU (or a CU) that is currently being encoded or decoded by a video codec 600.

An example of a video encoder that implements the video codec 600 will be described by reference to FIG. 10 below. An example of a video decoder that implements the video codec 600 will be described by reference to FIG. 12 below. The video codec 600 includes an intra-prediction module 604, an inter-prediction module 606, and a combined prediction module 608. In some embodiments, the modules 604-608 are modules of software instructions being executed by one or more processing units (e.g., a processor) of a computing device or electronic apparatus. In some embodiments, the modules 604-608 are modules of hardware circuits implemented by one or more integrated circuits (ICs) of an electronic apparatus. Though the modules 604-608 are illustrated as being separate modules, some of the modules can be combined into a single module.

The current block 610 is associated with intra information 612 and inter information 614. The intra-prediction module 604 generate an intra predictor 620 by using the intra information 612 to reference pixels spatially neighboring the current block 610. The inter-prediction module 606 generate an inter predictor 630 by using the inter information 614 and motion information 616 to reference pixels in other video pictures such as the video picture 602. The intra information 612 may include an index for selecting one of the intra-prediction modes (e.g., 33 directional modes, 1 planar mode, 1 DC mode, or other available intra-prediction modes). The inter information 614 may include a merge index for selecting a merge candidate from a merge candidates list. The inter predictor 630 is therefore also referred to as a merge-indexed predictor.

For a video codec that is encoding the current block 610, the intra information 612 and the inter information 614 are generated by intra-picture estimation and motion estimation algorithms and are to be encoded into a bitstream along with other encoded data for the video pictures 601 and 602. For a video codec that is decoding the current block 610, the intra information 612 and the inter information 614 are retrieved from a bitstream that includes encoded data of the video pictures 601 and 602.

The combined prediction module 608 produces a final predictor 640 based on the intra predictor 620 and the inter predictor 630. The combined prediction module 608 may generate a combined predictor based on an average or weighted sum of the intra predictor 620 and the inter predictor 630 as the final predictor 640.

One or more mode flags 650 indicates whether the current block 610 is in a combined prediction mode (e.g., IMP mode), intra-prediction mode, or some other prediction mode. If the current block is in a combined prediction mode, the combined prediction module 608 would use the generated combined predictor as the final predictor 650. Otherwise, the intra predictor 640 or the inter predictor 630 may be used as the final predictor 650. The mode flags 650 may include flags that are explicitly signaled in the bitstream. The mode flags may also include flags that are implicitly derived by the video codec 600.

In some embodiments, as the video codec 600 decides to encode or decode the current block by Intra mode, the video codec may encode or decode an IMP mode flag to determine whether the combined prediction mode is applied or not. This extra flag can be explicitly signaled with context coding in a bitstream that stores the current block. This explicitly signaled flag can be encoded at the coding unit (CU) level, the coding tree unit (CTU) level, the slice level, the picture level, the sequence parameter set (SPS) level, or the picture parameter set (PPS) level.

In some embodiments, when the video codec decides to encode or decode the current block by Intra mode, the IMP mode flag can be implicitly derived based on criterion such as the properties of the current block or the properties of the neighboring blocks of the current block. For example, if the block size, height, or width is larger than a threshold, combined prediction mode will be applied (i.e., merge mode is applied in addition to intra mode); otherwise, combined prediction mode will not be used (i.e., only intra mode is used). In still another example, if most of the neighboring blocks of the to-be-predicted current block are predicted by Inter-prediction (e.g., skip, merge, AMVP), the video codec would apply inter-prediction in addition to the Intra-prediction. In these instances, the bitstream may not include an explicit flag for indicating whether to apply combined prediction mode. In some embodiments, when the block (size/height/width) is smaller or larger than a threshold, the combined prediction mode cannot be used and the flag needs not be signaled.

In some embodiments, an IMP Merge candidate index is used and coded to select the Merge candidate for combined prediction mode. This IMP Merge index can be explicitly signaled in the bitstream as conventional merge mode index such as in HEVC.

In some embodiment, the IMP Merge index can be implicitly signaled in a predetermined way instead of explicit signaling. For example, the video codec may use a pre-defined table to map each intra-prediction mode to a corresponding merge candidate so the selected intra-prediction mode is obtained by an intra-prediction mode index and the selected merge candidate is obtained by mapping the intra-prediction mode index through the pre-defined table to a corresponding merge index.

As mentioned, a video codec encodes or decodes a block in combined prediction mode by selecting a Merge candidate from an IMP merge candidates list. This IMP Merge candidates list can be the same as the candidates list of conventional merge mode. This IMP Merge candidates list may also be different from the Merge candidates list of conventional Merge mode. In some embodiments, the IMP Merge candidates list contains only a subset of the "normal" Merge candidates list. For example, the IMP merge candidates list may include only the spatial merge modes that do not require explicit transmission of motion information from the encoder to the decoder. In other words, only skip and merge mode candidates are included in the IMP merge candidates list but not AMVP candidates. In some other embodiments, the IMP Merge candidates list may include additional merge candidates when compared to the "normal" merge candidates list.

In some embodiments, the video codec encodes or decodes an IMP-coded current block by reusing the inter-prediction motion information (e.g., motion vectors, reference lists, etc.) and/or the intra-prediction information (e.g. mode direction) of a neighboring block of the current block. Likewise, the intra-prediction information and the inter-prediction motion information of the IMP-coded current block can be referenced by other blocks (e.g., a subsequently encoded or decoded block).

FIGS. 7a-c illustrates referencing motion information and/or mode direction from neighboring blocks of a combination prediction coded block. These figures illustrate an IMP-coded block 710 that is associated with inter information (e.g., merge index) and intra information. During the encoding or decoding of the block 710, the mode direction used to perform intra-prediction and the motion information used to perform inter-prediction are saved and can be inherited by subsequently coded blocks.

FIG. 7a illustrates an intra-predicted block 721 that uses intra-prediction information (e.g., mode direction) from the IMP-coded block 710. The IMP-coded block 710 is a neighboring block of the intra-predicted block 721. The intra-predicted block 0721 uses the saved mode direction 731 from the IMP-coded block 710 to perform intra-prediction through e.g., MPM mechanism.

FIG. 7b illustrates an inter-predicted block 722 that uses saved motion information from the IMP-coded block 710. The IMP-coded block 710 is a neighboring block of the inter-predicted block 722. The inter-predicted block 722 uses the saved motion information 732 from the IMP-coded block 710 to perform inter-prediction.

FIG. 7c illustrates an IMP-coded block 723 that uses saved motion information and mode directions from the IMP-coded block 710. The IMP-coded block 710 is a neighboring block of the IMP-coded block 723. The IMP-coded block 723 uses the saved mode direction 731 and motion information 732 from the IMP-coded block 710 to perform inter-prediction and intra-prediction.

In some embodiments, the video codec applies IMP mode by applying inter-prediction to a first region of the current block and intra-prediction to a second region of the current block, the first and second regions may or may not be of equal size and may or may not overlap. In some embodiments, which region of the current block is coded by inter-prediction and which region of the current block is coded by intra-prediction is determined based on the position of the source of the inter-prediction motion information or intra-prediction mode direction relative to the current block. For example, when the motion information for IMP mode of the current block is derived from the neighboring block to the left of the current block, the region of that is closer to the left (or the left region) is coded by inter-prediction based on motion information inherited from the left neighboring block, while the region closer to the right may be coded by intra-prediction.

Figure 8:
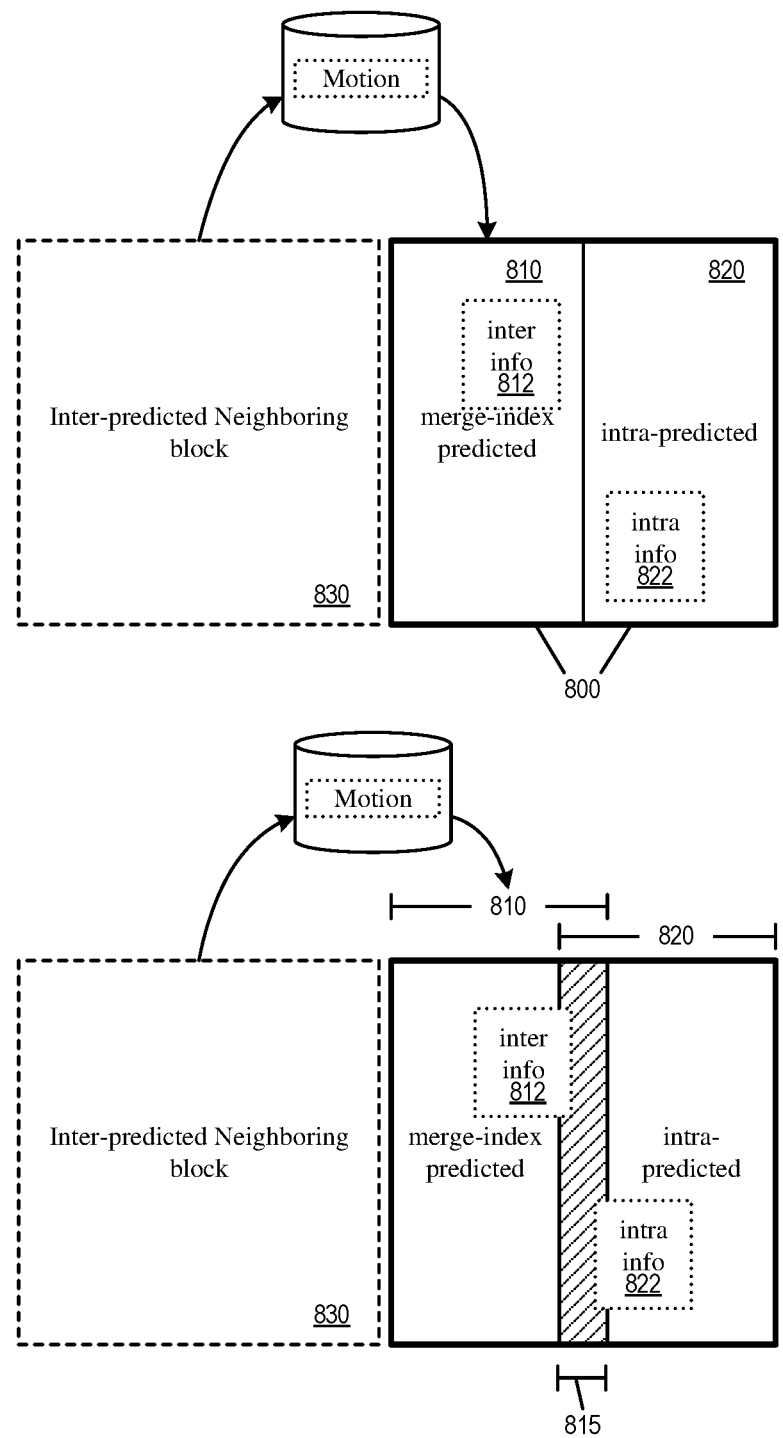
FIG. 8 illustrates applying inter-prediction to a first region of the current block and intra-prediction to a second region of the current block.

FIG. 8 illustrates applying inter-prediction to a first region of the current block and intra-prediction to a second region of the current block. As illustrated, a block 800 is currently being encoded or decoded under IMP mode. Rather than computing a combined prediction for the entire block 800, the block is divided into a left region 810 and a right region 820. The left region 810 is predicted by merge-indexed prediction based on inter information 812 while the right region 820 is predicted by intra-prediction based on intra information 822. The video codec encodes/decodes the left region 810 by inter-prediction (merge-indexed prediction) because the motion information used for inter-prediction of the block 800 is obtained from a neighboring block 830 at the left of the current block 800.

If the intra-predicted region and the inter-predicted region overlap, the prediction of the overlap region can be computed by averaging the prediction from inter-prediction and the prediction from intra-prediction. In some embodiments, weightings can be applied when averaging the prediction from inter-prediction and the prediction from intra-prediction in the overlap region.

FIG. 8 illustrates a scenario in which the inter-predicted region 810 overlap with the intra-predicted region 820 at an overlap region 815. In this scenario, the inter information 810 and the intra information 820 are both applicable to the overlap region 815, including the motion information obtained from the neighboring block 830. The pixels of the overlap region will be encoded or decoded based on a combined prediction of inter-prediction based on inter information 812 and intra-prediction based on intra information 822.

Generally, when the prediction generated by intra-prediction mode and the prediction generated by inter-prediction are both obtained for a given region (e.g., the entire block or the overlap region), simple average or weighted sum can be used to generate the combined prediction. In some embodiments, higher weightings are given to the prediction generated by Intra mode. In some embodiments, when there are more than one merge candidates that are available for IMP mode for the current block, the video coder may generate multiple predictions based on multiple merge candidates. The final prediction of the current block can be computed by the simple average or weighted sum of the predictions generated by the multiple merge candidates. In some embodiments, if the motion information used for computing the predictions of the different merge candidates are derived from spatially neighboring blocks, the weightings of the predictions can be given according to the pixel distances between the current block and those spatially neighboring blocks, closer pixel distances correspond to higher weightings.

Figure 9:
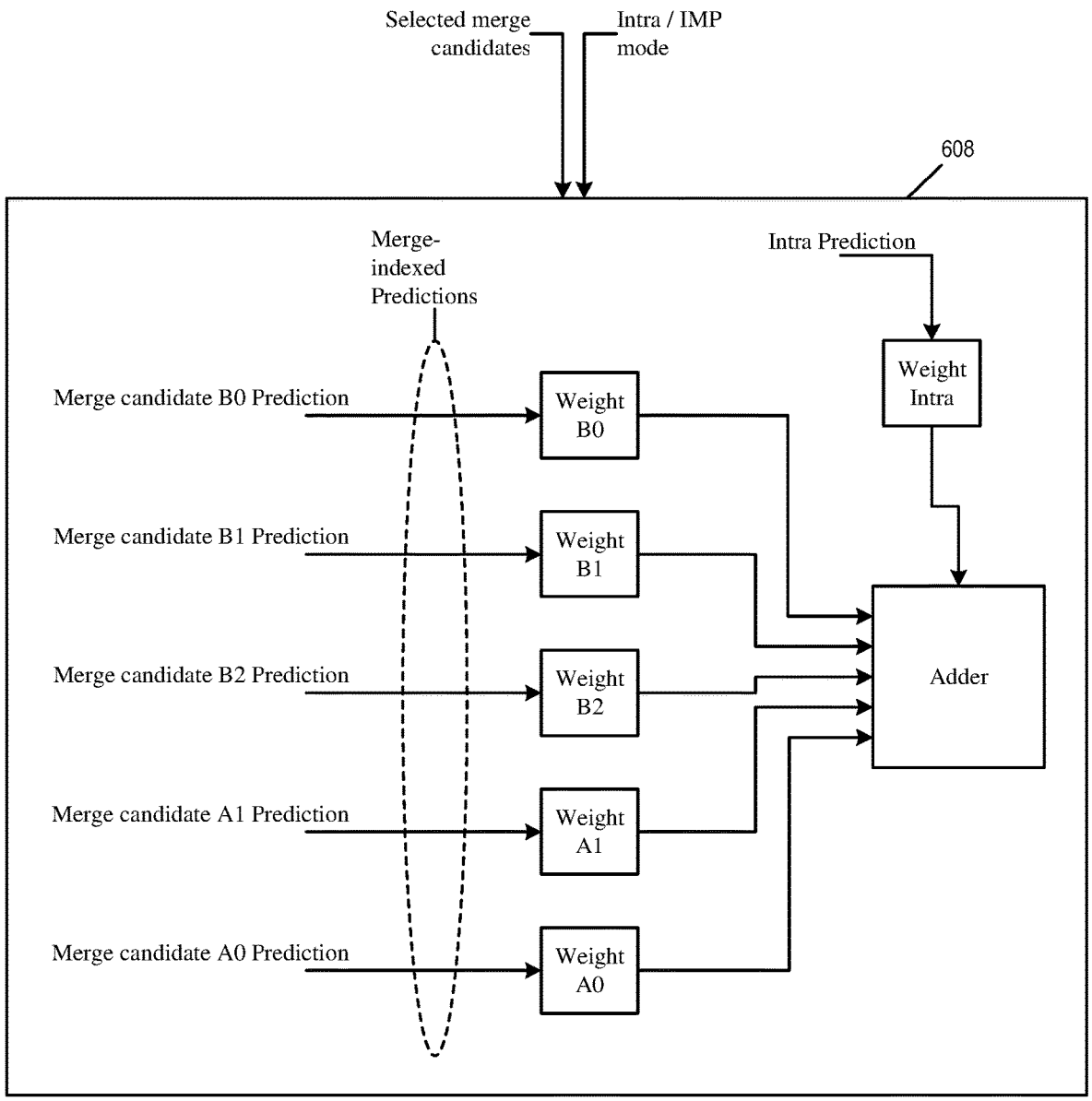
FIG. 9 conceptually illustrates applying weighting when combining intra-prediction with inter-predictions of multiple merge candidates.

FIG. 9 conceptually illustrates applying weighting when combining intra-prediction with inter-predictions of multiple merge candidates. In this example, the combined prediction module 608 receives predictors from intra-prediction, as well as various predictors from different merge candidates from different neighboring blocks (e.g., $B_0$, $B_1$, $B_2$, $A_1$, $A_0$ as described in FIG. 2). Each predictor of a merge candidate is weighted based on a property of the neighboring block that supplies the merge candidate. For example, the predictors for merge candidates $B_0$, $B_1$, $B_2$, $A_1$, $A_0$ are weighted based on the pixel distances from the current block to the corresponding respective blocks for candidates $B_0$, $B_1$, $B_2$, $A_1$, $A_0$.

In some embodiments, the combined prediction module 608 receives flags for determining whether to perform combined prediction (e.g., IMP mode), as well as flags for selecting which merge candidates to include in the combined prediction. These flags may alter the weighting values applied to the various different merge candidates according to which merge candidates are selected for combined prediction.

Example Video Encoder

Figure 10:
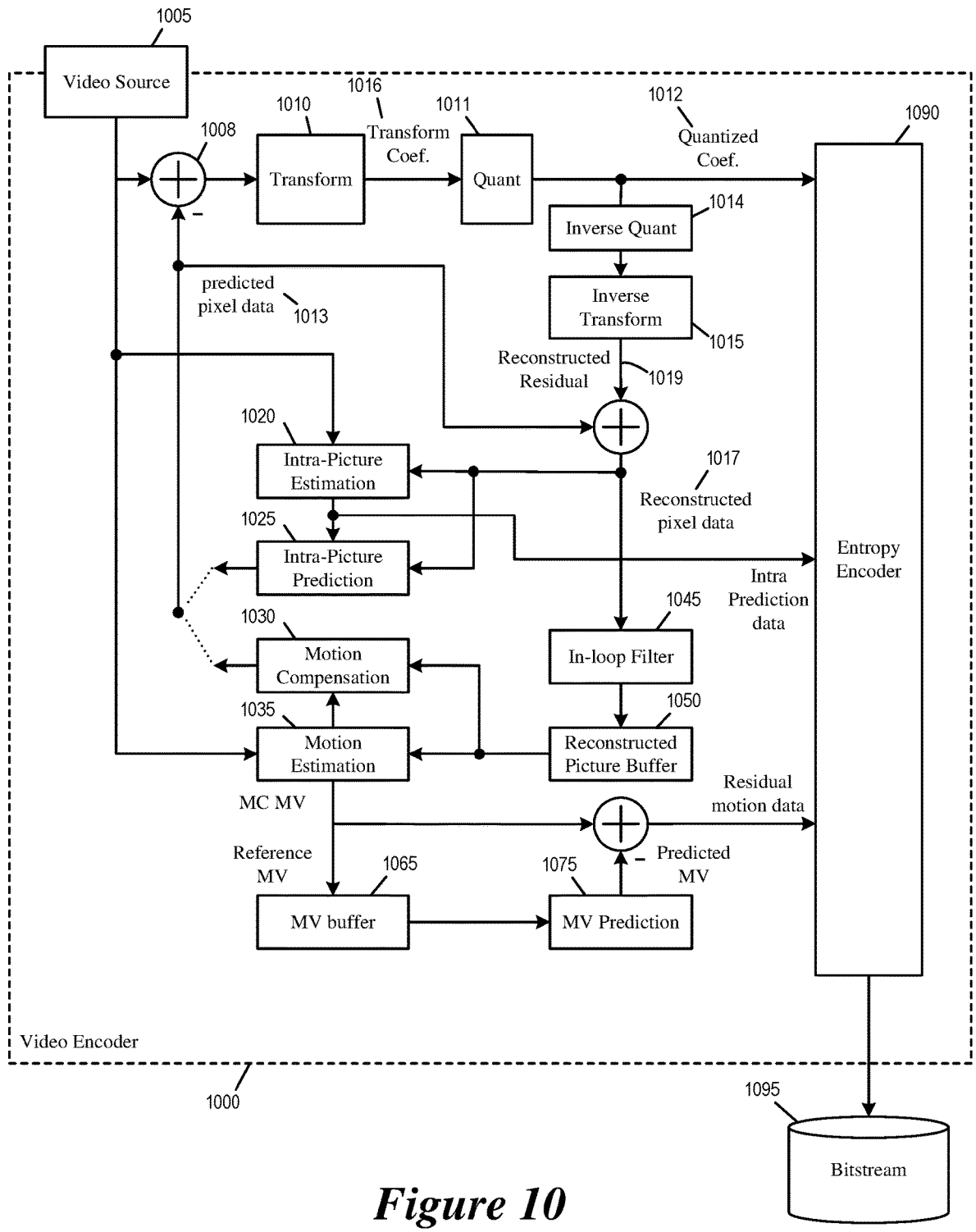
FIG. 10 illustrates an example video encoder.

FIG. 10 illustrates an example video encoder 1000. As illustrated, the video encoder 1000 receives input video signal from a video source 1005 and encodes the signal into bitstream 1095. The video encoder 1000 has several components or modules for encoding the video signal 1005, including a transform module 1010, a quantization module 1011, an inverse quantization module 1014, an inverse transform module 1015, an intra-picture estimation module 1020, an intra-picture prediction module 1025, a motion compensation module 1030, a motion estimation module 1035, an in-loop filter 1045, a reconstructed picture buffer 1050, a MV buffer 1065, and a MV prediction module 1075, and an entropy encoder 1090.

In some embodiments, the modules 1010-1090 are modules of software instructions being executed by one or more processing units (e.g., a processor) of a computing device or electronic apparatus. In some embodiments, the modules 1010-1090 are modules of hardware circuits implemented by one or more integrated circuits (ICs) of an electronic apparatus. Though the modules 1010-1090 are illustrated as being separate modules, some of the modules can be combined into a single module.

The video source 1005 provides a raw video signal that presents pixel data of each video frame without compression. A subtractor 1008 computes the difference between the raw video pixel data of the video source 1005 and the predicted pixel data 1013 from motion compensation 1030 or intra-picture prediction 1025. The transform 1010 converts the difference (or the residual pixel data or residual signal 1009) into transform coefficients (e.g., by performing Discrete Cosine Transform, or DCT). The quantizer 1011 quantized the transform coefficients into quantized data (or quantized coefficients) 1012, which is encoded into the bitstream 1095 by the entropy encoder 1090.

The inverse quantization module 1014 de-quantizes the quantized data (or quantized coefficients) 1012 to obtain transform coefficients, and the inverse transform module 1015 performs inverse transform on the transform coefficients to produce reconstructed residual 1019. The reconstructed residual 1019 is added with the prediction pixel data 1013 to produce reconstructed pixel data 1017. In some embodiments, the reconstructed pixel data 1017 is temporarily stored in a line buffer (not illustrated) for intra-picture prediction and spatial MV prediction. The reconstructed pixels are filtered by the in-loop filter 1045 and stored in the reconstructed picture buffer 1050. In some embodiments, the reconstructed picture buffer 1050 is a storage external to the video encoder 1000. In some embodiments, the reconstructed picture buffer 1050 is a storage internal to the video encoder 1000.

The intra-picture estimation module 1020 performs intra-prediction based on the reconstructed pixel data 1017 to produce intra-prediction data. The intra-prediction data is provided to the entropy encoder 1090 to be encoded into bitstream 1095. The intra-prediction data is also used by the intra-picture prediction module 1025 to produce the predicted pixel data 1013.

The motion estimation module 1035 performs inter-prediction by producing MVs to reference pixel data of previously decoded frames stored in the reconstructed picture buffer 1050. These MVs are provided to the motion compensation module 1030 to produce predicted pixel data. Instead of encoding the complete actual MVs in the bitstream, the video encoder 1000 uses MV prediction to generate predicted MVs, and the difference between the MVs used for motion compensation and the predicted MVs is encoded as residual motion data and stored in the bitstream 1095.

The MV prediction module 1075 generates the predicted MVs based on reference MVs that were generated for encoding previously video frames, i.e., the motion compensation MVs that were used to perform motion compensation. The MV prediction module 1075 retrieves reference MVs from previous video frames from the MV buffer 1065. The video encoder 1000 stores the MVs generated for the current video frame in the MV buffer 1065 as reference MVs for generating predicted MVs.

The MV prediction module 1075 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1095 by the entropy encoder 1090.

The entropy encoder 1090 encodes various parameters and data into the bitstream 1095 by using entropy-coding techniques such as context-adaptive binary arithmetic coding (CABAC) or Huffman encoding. The entropy encoder 1090 encodes parameters such as quantized transform data and residual motion data into the bitstream 1095. The bitstream 1095 is in turn stored in a storage device or transmitted to a decoder over a communications medium such as a network.

The in-loop filter 1045 performs filtering or smoothing operations on the reconstructed pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
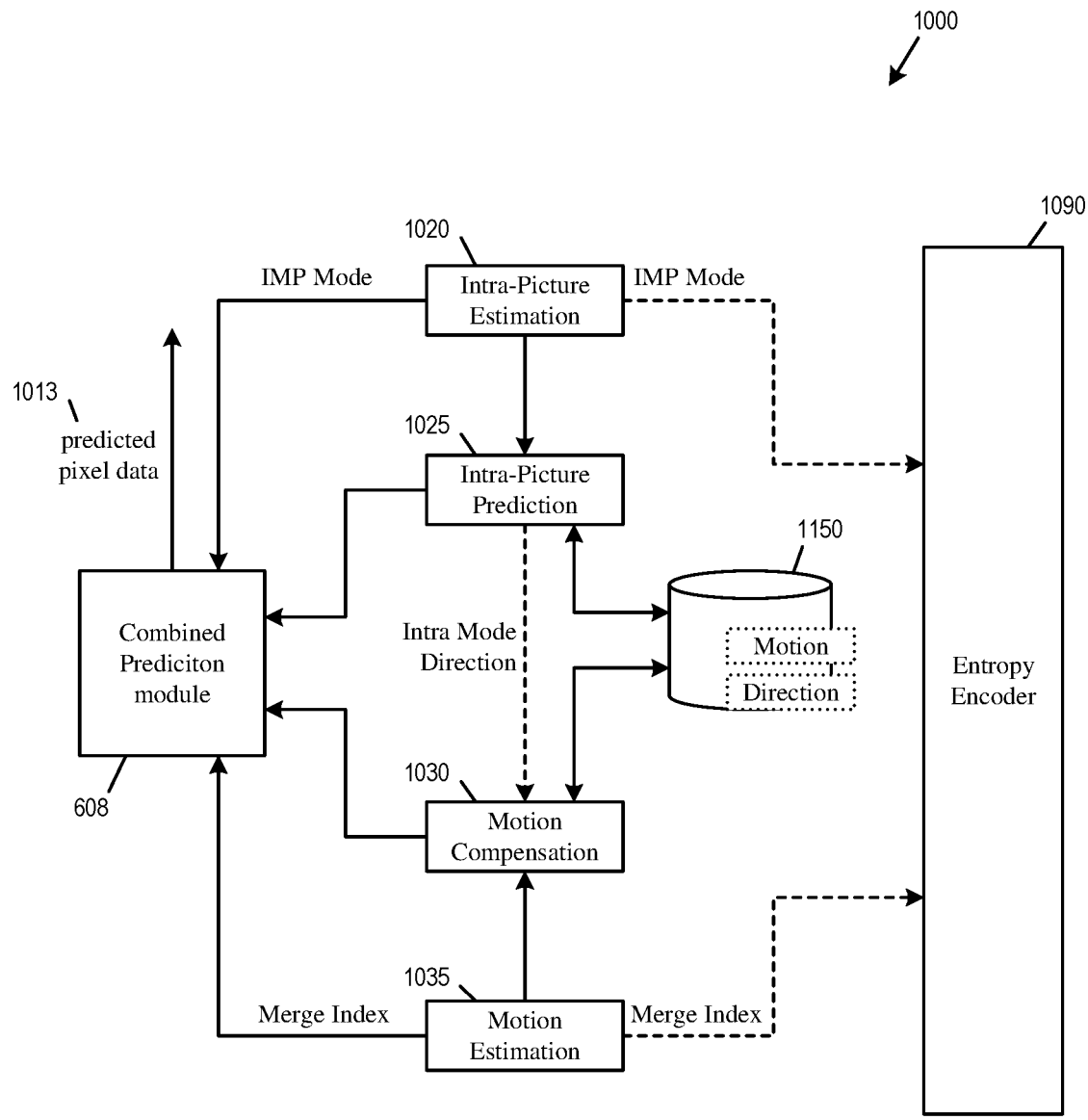
FIG. 11 illustrates portions of the video encoder that may implement the combined prediction mode when encoding a block of pixels.

FIG. 11 illustrates portions of the video encoder 1000 that may implement the combined prediction mode when encoding a block of pixels. As illustrated, the video encoder 1000 implements the combined prediction module 608, which produces the predicted pixel data 1013. The combined prediction module 608 receives intra-mode prediction values (i.e., intra-predictor) generated by the intra-picture prediction module 1025. The combined prediction module 608 also receives inter-mode prediction values (i.e., inter-predictor or merge index predictor) from the motion compensation module 1030. The motion compensation 1030 may generate multiple merge index predictors for multiple different merge candidates for the combined prediction module 608. The motion information and mode directions used for encoding a pixel block by the motion compensation module 1030 and the intra-picture prediction module 1025 are saved in storage 1150 for use by the same modules for subsequent blocks.

The received predictions are weighted and summed based on flags generated by the intra-picture estimation module 1020 and the motion estimation module 1035, flags such as IMP mode and index/indices of selected merge candidate(s). In some embodiments, the same flags that control the operations of the combined prediction module 608 are also provided to the entropy encoder 1090 to be context coded as part of the bitstream 1095.

Example Video Decoder

Figure 12:
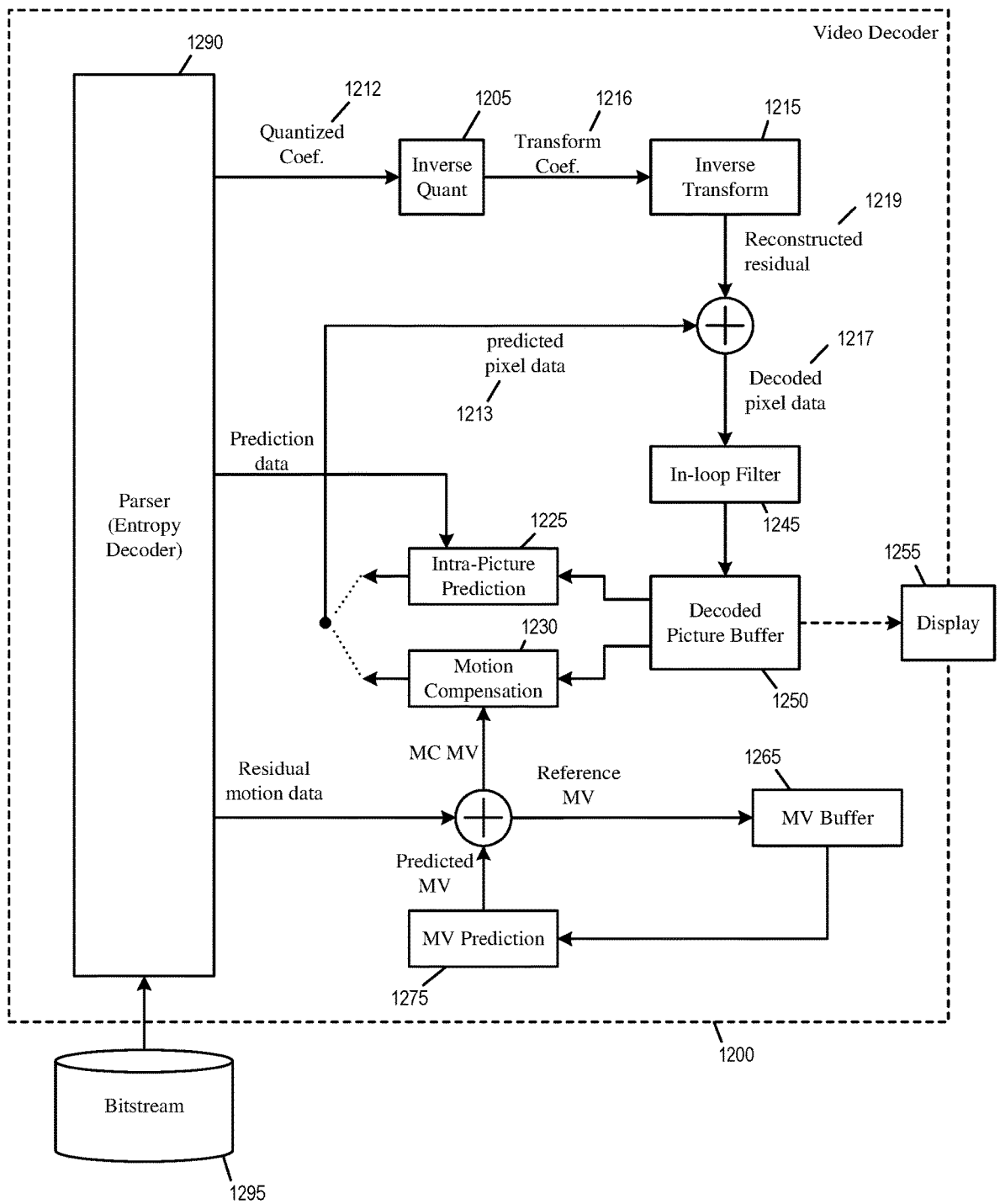
FIG. 12 illustrates an example video decoder.

FIG. 12 illustrates an example video decoder 1200. As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including an inverse quantization module 1205, an inverse transform module 1215, an intra-picture prediction module 1225, a motion compensation module 1230, an in-loop filter 1245, a decoded picture buffer 1250, a MV buffer 1265, a MV prediction module 1275, and a bitstream parser 1290.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1205 de-quantizes the quantized data (or quantized coefficients) 1212 to obtain transform coefficients, and the inverse transform module 1215 performs inverse transform on the transform coefficients 1216 to produce reconstructed residual signal 1219. The reconstructed residual signal 1219 is added with prediction pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-picture prediction module 1225 receives prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
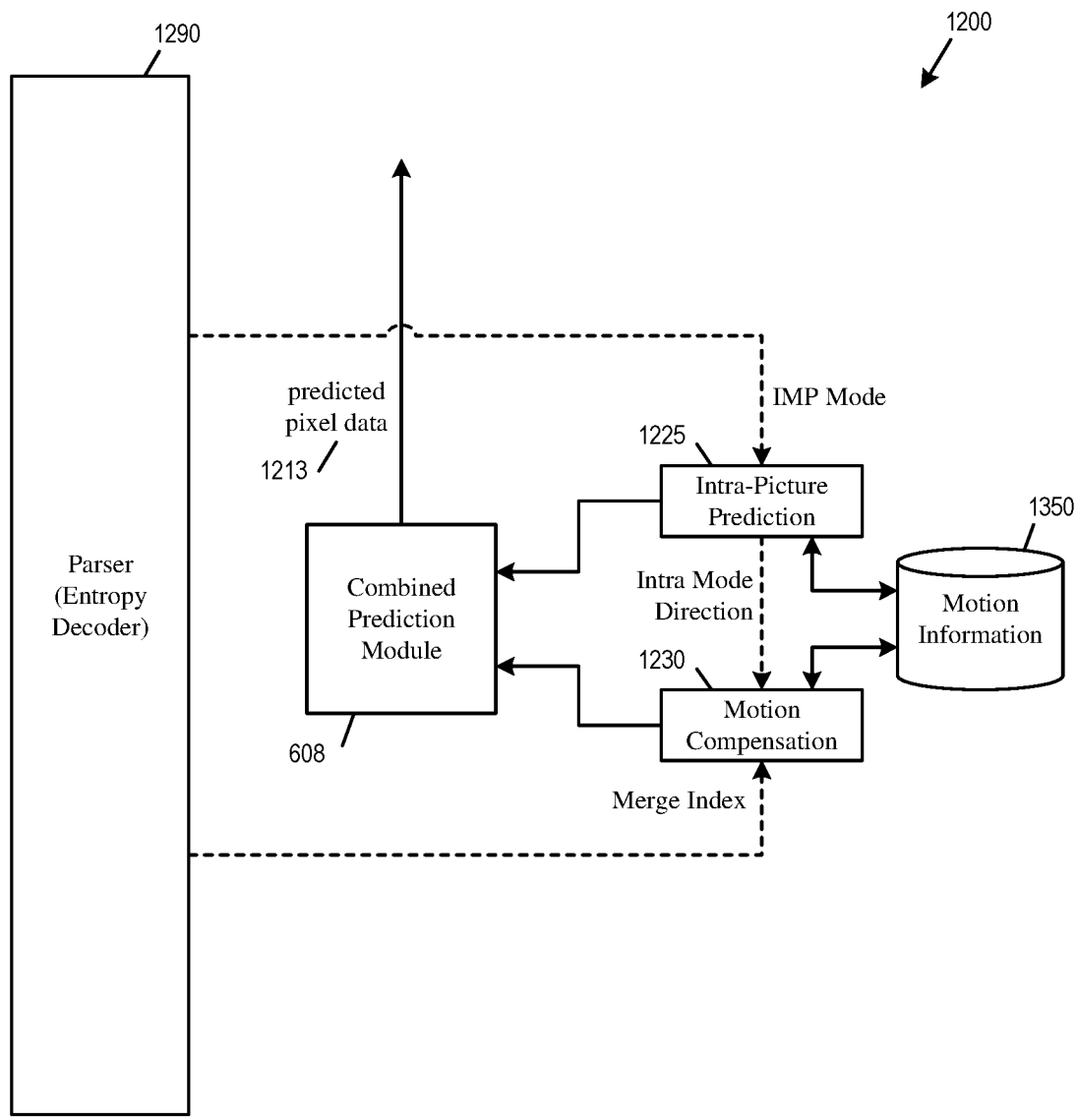
FIG. 13 illustrates portions of the video decoder that may implement combined prediction mode when decoding a block of pixels.

FIG. 13 illustrates portions of the video decoder 1200 that may implement combined prediction mode when decoding a block of pixels. As illustrated, the video decoder implements the combined prediction module 608, which produces the predicted pixel data 1213. The combined prediction module 608 receives intra-mode prediction values (i.e., intra-predictor) generated by the intra-picture prediction module 1225. The combined prediction module also receives inter-mode prediction values (i.e., inter-predictor or merge index predictor) from the motion compensation module 1230. The motion compensation 1230 may generate multiple merge index predictors for multiple different merge candidates for the combined prediction module 608. The motion information and mode directions used for decoding a pixel block by the motion compensation module 1230 and the intra-picture prediction module 1225 are saved in storage 1350 for use by the same modules for subsequent blocks.

The received predictions are weighted and summed based on flags such as IMP mode and index/indices of selected merge candidate(s). In some embodiments, these flags that control the operations of the combined prediction module 608 are provided by the entropy decoder 1290 by parsing the bitstream 1295. In some embodiments, these flags are generated by the intra-picture prediction module 1225 and the motion compensation module 1230 based on the properties of the pixel blocks being decoded.

Figure 14A:
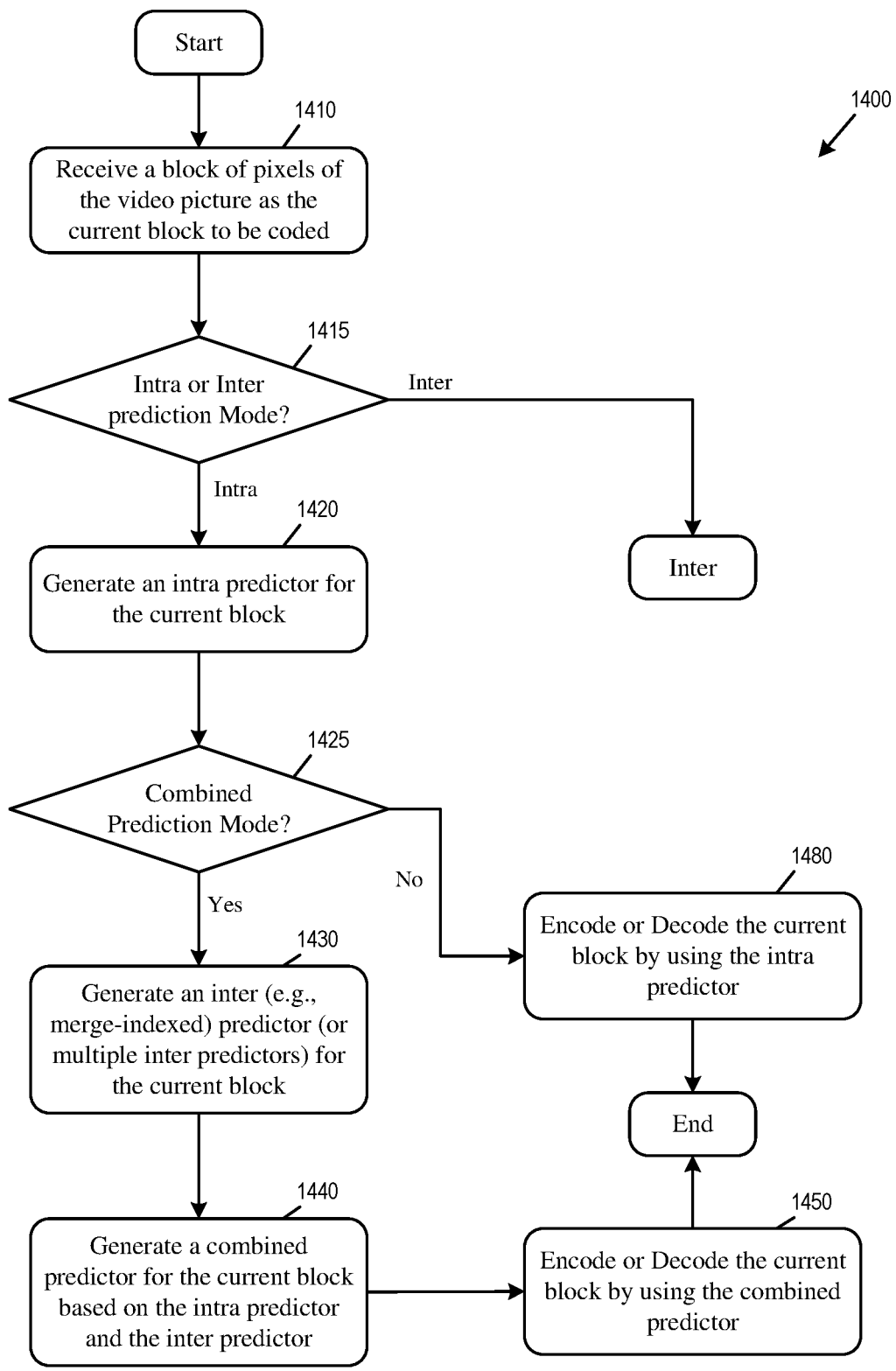
FIGS. 14a-b conceptually illustrate a process that a video codec uses to implement combined prediction mode when encoding or decoding a block of pixels of a video picture.
Figure 14B:
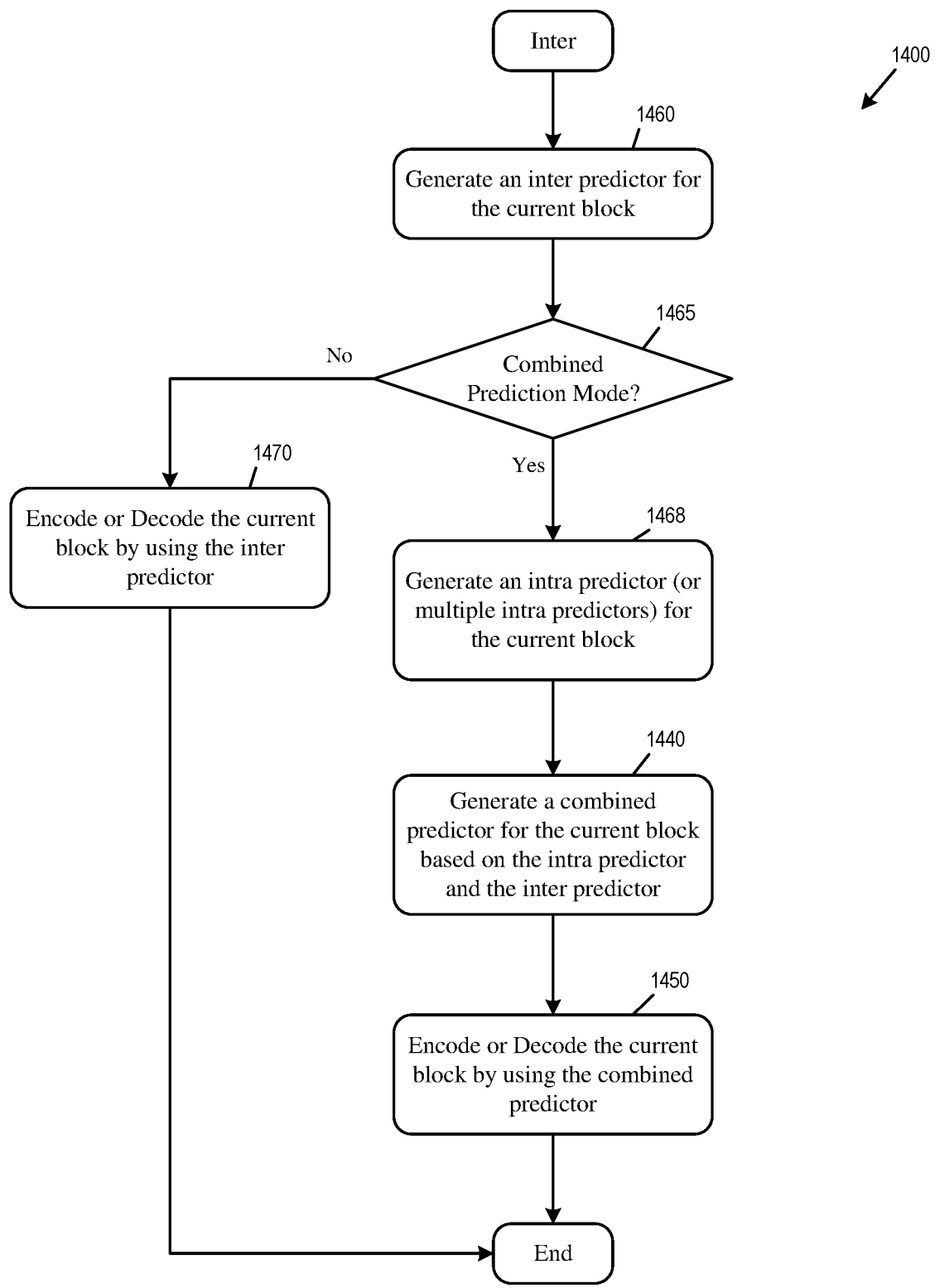

FIGS. 14*a-b* conceptually illustrate a process 1400 that a video codec uses to implement combined prediction mode or IMP mode when encoding or decoding a block of pixels of a video picture. In some embodiments, one or more processing units (e.g., a processor) of a computing device implementing the encoder 1000 or the decoder 1200 performs the process 1400 by executing instructions stored in a computer readable medium. In some embodiments, an electronic apparatus implementing the encoder 1000 or the decoder 1200 performs the process 1400.

The video codec receives (at step 1410) the block of pixels of the video picture as the current block to be coded. The block of pixels may come from a raw video to be encoded into a bitstream as a PU or a CU. The block of pixels may also come from a bitstream as a PU or a CU to be decoded into pixel data.

The video codec determines (at step 1415) whether the current block is coded by using intra-prediction or inter-prediction. The video codec may make this determination based on flags explicitly coded in a bitstream. The video codec may make this determination based on properties of the current block. If the current block is coded by intra-prediction, the process proceeds to 1420. Otherwise, the current block is coded by inter-prediction, and the process proceeds to 1460.

At step 1420, the video codec generates an intra predictor for the current block. The intra predictor are predicted pixel values generated based on one of the available intra-prediction modes.

The video codec then determines (at step 1425) whether the combined prediction mode is applied or to be applied to the current block. For an encoder, this is determined by, for example, performing the rate-distortion optimization (RDO) method and, the determination result can be indicated by an explicitly signaled flag incorporated in the bitstream. Alternatively, this can be determined, by the encoder, based on properties of the block such as the size (e.g., width, height, or area) of the current block or the prediction types of the neighboring blocks. For a decoder, this is determined by parsing a context-coded explicit flag in a bitstream, or determined based on properties of the block such as the size (e.g., width, height, or area) of the current block or the prediction types of the neighboring blocks. If the current block is (to be) coded by combined prediction mode, the process proceeds to step 1430. If the current block is not coded by combined prediction mode, the process proceeds to step 1480.

At step 1480, the video codec encodes or decodes the current block by using the generated intra predictor as the final predictor to provide the predicted pixel data. At this stage, the video codec has decided to perform only intra-prediction but not combined prediction. The process 1400 then ends.

At step 1430, the video codec generates an inter or merge-indexed predictor based on one merge candidate, or multiple inter or merge-indexed predictors based on multiple merge candidates. In some embodiments, an IMP-coded block is encoded with a merge index or multiple merge indices in the bitstream for selecting merge candidates. The video codec may use the motion information from a previous block to perform the inter-prediction of the current, IMP-coded block. The motion information used to perform the inter-prediction of the current IMP-coded block may also be used to perform inter-prediction of a subsequent block. The process then proceeds to step 1440.

At step 1460, the video codec generates an inter predictor or merge indexed predictor. The video codec then determines (at step 1465) whether the combined prediction mode is applied or to be applied to the current block. For an encoder, this is determined by, for example, performing the rate-distortion optimization (RDO) method and, the determination result can be indicated by an explicitly signaled flag incorporated in the bitstream. Alternatively, this can be determined, by the encoder, based on properties of the block such as the size (e.g., width, height, or area) of the current block or the prediction types of the neighboring blocks. For a decoder, this is determined by parsing a context-coded explicit flag in a bitstream, or this is determined based on properties of the block such as the size (e.g., width, height, or area) of the current block or the prediction types of the neighboring blocks. If the current block is (to be) coded by combined prediction mode, the process proceeds to step 1468. If the current block is not coded by combined prediction mode, the process proceeds to step 1470.

At step 1468, the video codec the video codec generates an intra predictor or multiple intra predictors. The process then proceeds to step 1440.

At step 1470, the video codec encodes or decodes the current block by using the generated inter predictor as the final predictor to provide the predicted pixel data. At this stage, the video codec has decided to perform only inter-prediction but not combined prediction. The process 1400 then ends.

At step 1440, the video codec generates a combined predictor for the current block based on the generated intra predictor and the generated inter predictor(s) by performing average or weighted sum of the predictors. The video codec then encodes or decodes (at step 1450) the current block by using the combined predictor as the final predictor to provide the predicted pixel data (e.g., 1013 or 1213). The process 1400 then ends.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
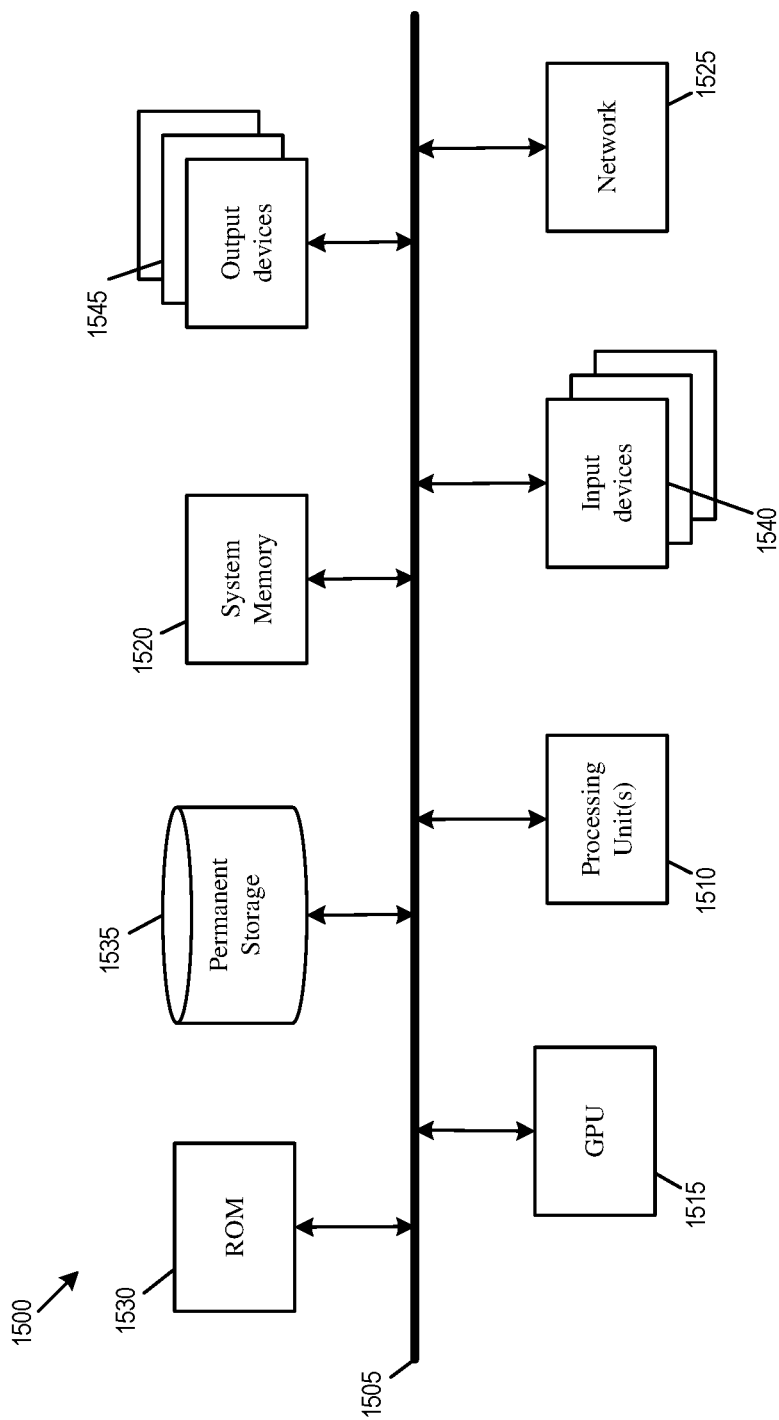
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random-access memory. The system memory 1520 stores some of the instructions and data that the processor needs at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for encoding or decoding a video picture, comprising:
   determining whether to use a combined prediction mode for a current block of the video picture; and
   when it is determined that the combined prediction mode is used:
      generating an intra predictor for the current block based on a selected intra-prediction mode, the generating of the intra predictor comprising using a mode direction or intra-prediction information to reference pixels spatially neighboring the current block;
      generating a merge-indexed predictor for the current block based on a selected merge candidate from a merge candidates list that does not include an intra candidate, the generating of the merge-indexed predictor comprising using inter-prediction motion information to reference pixels in other video pictures;

generating a final predictor for the current block using both the intra predictor and the merge-indexed predictor; and encoding or decoding the current block by using the final predictor, wherein the intra-prediction information or the inter-prediction motion information is referenced by subsequently encoded or decoded blocks, wherein the selected merge candidate is selected based on a signaled or parsed merge index, and wherein the merge candidate list includes one or more merge candidates using motion information that is implicitly derived.

2. The method of claim 1, wherein determining whether to use the combined prediction mode comprises determining whether an explicitly signaled flag for the combined prediction mode is set in a bitstream that encodes the current block.

3. The method of claim 2, wherein the explicitly signaled flag is encoded in at least one of coding unit (CU) level, coding tree unit (CTU) level, slice level, picture level, sequence parameter set (SPS) level, and picture parameter set (PPS) level.

4. The method of claim 2, wherein the explicitly signaled flag is coded by using context coding.

5. The method of claim 1, wherein determining whether to use the combined prediction mode comprises determining whether to perform inter-prediction in addition to intra-prediction.

6. The method of claim 1, wherein determining whether to use the combined prediction mode comprises determining whether to perform intra-prediction in addition to inter-prediction.

7. The method of claim 1, wherein a flag determining whether to use the combined prediction mode is implicitly derived.

8. The method of claim 7, wherein the flag is implicitly derived based on a width, a height, or a size of the current block, or a prediction type of a neighboring block of the current block.

9. The method of claim 1, wherein the selected merge candidate is selected based on a merge index that is explicitly encoded in a bitstream that includes the current block.

10. The method of claim 1, wherein the selected intra-prediction mode is selected based on an intra mode index that is explicitly encoded in a bitstream that includes the current block.

11. The method of claim 1, wherein the selected merge candidate is selected based on a merge index that is obtained by mapping an intra-prediction mode index through a pre-defined table.

12. The method of claim 1, wherein the merge candidates list does not include any merge candidate that requires explicit transmission of motion information.

13. The method of claim 1, wherein the mode direction used to generate the intra predictor of the current block and motion information used to generate the merge-indexed predictor of the current block are saved for use by a subsequently coded block that is coded by intra mode, inter mode, or combined prediction mode.

14. The method of claim 1, wherein encoding or decoding the current block by using the final predictor comprises using the intra predictor to encode or decode a first region of the current block and using the merge-indexed predictor to encode or decode a second region of the current block different from the first region.

15. The method of claim 1, wherein generating the final predictor comprises obtaining a simple average or weighted sum of the generated intra predictor and the generated merge-indexed predictor.

16. The method of claim 1, wherein the merge-indexed predictor is a first merge-indexed predictor, wherein the method further comprises generating a second merge-indexed predictor for the current block, and wherein generating the final predictor comprises obtaining a weighted sum of the generated intra predictor, the first merge-indexed predictor, and the second merge-indexed predictor.

17. The method of claim 16, wherein the weighted sum is based on a first weight for the first merge-indexed predictor and a second weight for the second merge-indexed predictor, wherein the first weight is determined based on a first pixel distance between the current block and a first neighboring block that provides motion information for the first merge-indexed predictor, and wherein the second weight is determined based on a second pixel distance between the current block and a second neighboring block that provides motion information for the second merge-indexed predictor.

18. An electronic apparatus comprising:
a video decoder circuit capable of:
determining whether to use a combined prediction mode for a current block of pixels of the video picture; and
when it is determined that the combined prediction mode is used:
generating an intra predictor for the current block based on a selected intra-prediction mode, the generating of the intra predictor comprising using a mode direction or intra-prediction information to reference pixels spatially neighboring the current block;
generating a merge-indexed predictor for the current block based on a selected merge candidate from a merge candidates list that does not include an intra candidate, the generating of the merge-indexed predictor comprising using inter-prediction motion information to reference pixels in other video pictures;
generating a final predictor for the current block using both the intra predictor and the merge-indexed predictor; and
decoding the current block by using the final predictor; and
outputting the decoded current block of pixels,
wherein the intra-prediction information or the inter-prediction motion information is referenced by subsequently decoded blocks,
wherein the selected merge candidate is selected based on a signaled or parsed merge index, and
wherein the merge candidate list includes one or more merge candidates using motion information that is implicitly derived.

19. An electronic apparatus comprising:
a video encoder circuit capable of:
determining whether to use a combined prediction mode for a current block of pixels of the video picture; and
when it is determined that the combined prediction mode is used:
generating an intra predictor for the current block based on a selected intra-prediction mode, the generating of the intra predictor comprising using a mode direction or intra-prediction information to reference pixels spatially neighboring the current block;

generating a merge-indexed predictor for the current block based on a selected merge candidate from a merge candidates list that does not include an intra candidate, the generating of the merge-indexed predictor comprising using inter-prediction motion information to reference pixels in other video pictures;

generating a final predictor for the current block using both the intra predictor and the merge-indexed predictor; and encoding the current block by using the final predictor; and storing the encoded current block in a bitstream, wherein the intra-prediction information or the inter-prediction motion information is referenced by subsequently encoded blocks, wherein the selected merge candidate is selected based on a signaled or parsed merge index, and wherein the merge candidate list includes one or more merge candidates using motion information that is implicitly derived.

* * * * *